Patented May 28, 1946

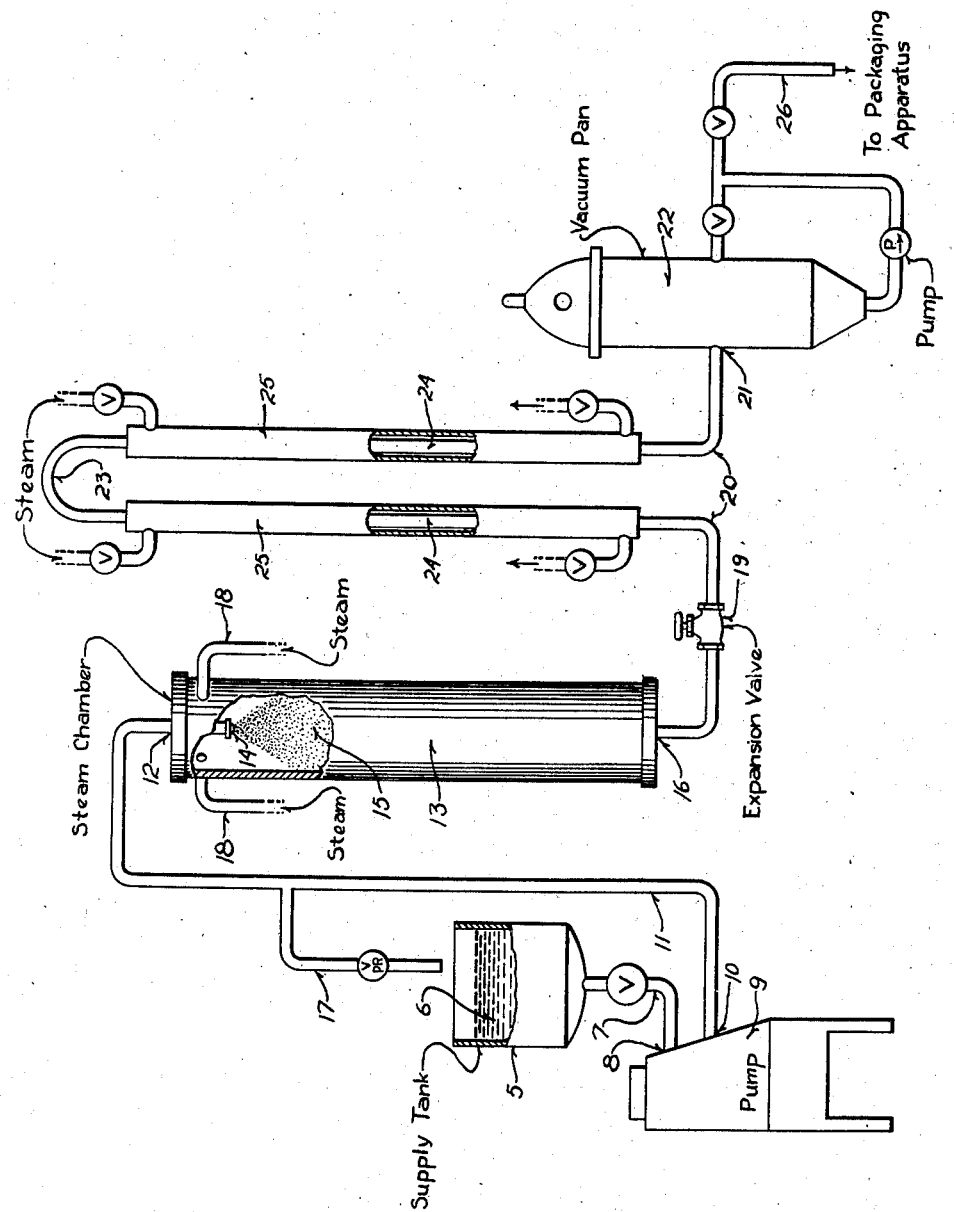

2,401,077

UNITED STATES PATENT OFFICE 2,401,077

METHOD OF STERILIZING LIQUIDS

Edward C. Johnston, Milwaukee, Wis., assignor to Robert A. Johnston Company, Milwaukee, Wis., a corporation of Wisconsin Application January 11, 1943, Serial No. 472,011

3 Claims. (Cl. 99—211)

This invention concerns the food industry and refers particularly to the sterilization of such liquiform food products as milk, condensed milk and other allied milk products like chocolate and cocoa syrups or beverages and various types of toppings familiar to the confection industry, as well as orange and other fruit juices and soups.

The necessity of complete sterilization of canned milk and other canned food products as distinguished from pasteurization or preservation by the addition of preservatives is well recognized especially when such food products are to be kept in storage for considerable periods of time before being consumed.

Since in most instances it is impossible to add chemicals to food products for sterilizing the same, heat has been universally accepted as the most satisfactory sterilizing medium.

Ordinarily canned goods are subjected to heat in excess of 212° F. for a period of time depending upon the nature of the food products and the period of storage estimated before the goods are to be consumed.

Milk and various milk products, however, normally contain many types of heat resisting bacteria and spores and it has been necessary in the past to subject canned milk products to a sterilizing temperature of at least 240° F. for a period ranging from 20 to 35 minutes to effect their complete sterilization. In some cases sterilization has been effected through subjection of the products to higher sterilizing temperatures in an effort to shorten the duration of the heat treatment.

The excessive heat and its lengthy application to milk products necessary to effect complete destruction of micro-organisms therein, however, has never been wholly satisfactory with respect to the quality of the sterilized product. In all past methods, sterilization of milk products has been effected only at the expense of flavor and stability of the products.

An example of flavor change in a sterilized milk product is had by reference to condensed and evaporated milks, both of which in the process of sterilization lose their original fresh milk flavor and take on an undesirable "cooked" or "metallic" flavor. Because of their cooked or metallic flavor condensed and evaporated milks are unacceptable to a great many people.

The cooked taste common to all condensed milks has for long been known to result from the excessive sterilizing temperatures to which the milk is subjected, but all attempts to reduce either the temperature or the duration of the application of heat to the milk in the sterilizing process in an effort to avoid flavor change have ended in failure to completely destroy the bacteria and spores in the milk. Obviously, an incompletely sterilized product is subject to spoilage due to the growth of bacteria and spores in the product.

Another very undesirable characteristic of milk products rendered sterile by the thermal method is the lack of resistance of the products to coagulation.

It is therefore one of the objects of this invention to provide an improved method for sterilizing milk as well as other liquiform food products the practice of which does not result in alteration in the flavor or stability of the food products treated.

More specifically it is an object of this invention to provide an improved process for sterilizing milk and other liquiform food products in which sterilization is effected extremely rapidly and before such physical and chemical changes occur which have a tendency to produce flavor change in the products.

Another object of this invention resides in the provision of a sterilizing process wherein the food products are subjected to abrupt pressure change and heat in excess of 212° F. so as to accelerate complete destruction of bacteria and spores in the products.

A further object of this invention is to provide an improved method of sterilizing liquid materials in which the destruction of bacteria and their spores is effected by subjecting the materials to sterilizing temperatures while said materials are in a finely atomized mist-like state capable of being instantaneously heated to a sterilizing temperature.

Still another object resides in the provision of a simple and efficient apparatus for practicing the sterilizing process of this invention.

With the above and other objects in view, which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and wherein single figure diagrammatically illustrates one form of apparatus for carrying out the method of this invention.

As stated, the primary object of this invention is the provision of a method for sterilizing liquid material which is especially suited for the sterilization of such liquiform foods as milk and various milk products.

In order to effect complete and efficient sterilization of any liquiform material including water, the method of this invention entails reducing the material to a finely atomized mist-like state which substantially instantaneously enables all particles of the material to be acted upon by any suitable sterilizing medium.

In the case of milk products, to insure against flavor change and loss of stability, the method of this invention contemplates rapidly heating the atomized material to be sterilized to a sterilizing temperature in excess of 212° F. to render bacteria and spores in the products completely impotent before physical and chemical changes occur in the products such as to alter either the flavor or stability thereof. This is accomplished by applying heat to the food material to be sterilized while said material is in a finely atomized mist-like state in which it readily absorbs heat.

Preferably the milk products while in said atomized or mist-like state are thoroughly admixed with steam at such a temperature as to rapidly bring the temperature of each particle of the material to between 250° and 280° F., although these temperatures may be above 300° F. in the case of fruit juices and soups.

The use of steam is highly advantageous in that it enables minute particles of steam at high temperature to come into intimate contact with the minute food particles to raise the temperature thereof to a sterilizing temperature more rapidly than is possible by any other manner of applying heat to the material.

The method best suited for reducing the liquiform material to a finely atomized mist-like state and for rapidly sterilizing the material while in said state comprises spraying the liquiform material at high pressure through a spray nozzle into a low pressure steam-filled chamber maintained at a sterilizing temperature of from 250° to 300° F. or over so that all of the particles of the material are substantially instantaneously heated to a temperature high enough to effect destruction of the bacteria and spores therein. Temperatures of between 250° to 280° have been found satisfactory in the sterilization of milk products.

This method of destroying bacteria and spores in the food materials, however, does not rely alone upon the temperature of the steam, for inasmuch as the liquiform material is alternately subjected to high and low pressure, large numbers of bacteria and spores are destroyed as the result of rapid expansion when the food material is sprayed into the low pressure steam chamber. Any bacteria or spores surviving this sudden release of pressure and initial application of heat are effectively destroyed inside six seconds during which time the heat treatment is continued, and during which time the already expanded micro-organisms remaining are further expanded until rupturing occurs or until they are destroyed by heat.

The food material after thus being completely sterilized and while in said mist-like state is discharged from the steam chamber into a vacuum pan for liquification and where any desired degree of concentration of the food material may be effected.

From the vacuum pan the food material may be delivered to packaging apparatus such as canning machinery and sealed in sterile condition.

Although steam has been used heretofore for the sterilization of liquiform food products it was generally injected directly into the material to be sterilized while the same was in a liquid state. Consequently, complete sterilization depended upon a protracted period of steam injection in which the impactive effect of the steam particles on the liquid material aided in destroying microorganisms.

The method of this invention however is not dependent upon either a heat treatment of long duration or the impactive effect of steam on the food material being sterilized.

In the improved method of this invention, the impact of steam particles against the food material is deliberately avoided since it appears that the physical or chemical change which such methods effect in the materials is responsible for reduced stability and flavor change in the sterilized product.

It is only necessary, therefore, to finely atomize the liquids to be sterilized, which as stated, entails alternate abrupt subjection of the liquid materials to high and low pressures, and to subject the liquid material to any suitable sterilizing medium while the material is in said finely atomized mist-like state. It is to be understood that sterilizing mediums other than steam may be employed in the successful practice of this invention, especially when sterilizing water or other liquids not generally classifiable as food materials.

When sterilizing milk products, the finely atomized products are caused to flow along a defined path together with steam, which is introduced into the sterilizing chamber in such a manner that the steam particles thoroughly commingle with and substantially instantaneously render the bacteria in the individual particles of the atomized food material impotent.

Milk products such as canned milk, and chocolate or cocoa syrups and beverages or the like, when sterilized by the hereindescribed method, have no noticeable "cooked" or "metallic" taste which has been hitherto accepted as inevitable in sterilized milk products.

The single figure of the drawing illustrates an apparatus suitable for carrying out the method of this invention and which apparatus includes a tank 5 adapted to hold a quantity of milk or other liquiform material 6 to be sterilized. The tank 5 is preferably open at its top or otherwise vented for a purpose to be later described.

A duct 7 leading from the bottom of the tank connects the same with the inlet 8 of a high pressure pump 9 capable of developing pressures up to at least 3000 lbs. per square inch. If desired, the pump may be in the nature of a homogenizer.

The outlet 10 of the pump is connected through a duct 11 with the inlet 12 of a sterilizing chamber 13 in which sterilization of the food materials is effected. The sterilizing chamber 13 preferably comprises an upright elongated cylinder constructed of stainless steel.

The milk or other liquiform material 6 is forced by the pump 9 into the inlet 12 at the top of the sterilizing chamber 13 at substantially 3000 lbs. per square inch pressure through a spray nozzle 14 designed to reduce the liquid material to a finely atomized mist-like state and which directs the atomized material indicated by the numeral 15 downwardly toward the outlet 16 of the chamber.

A duct 17 connecting with the duct 11 leads to the open top of the supply tank 5 and by passes material to the tank through a pressure relief valve in the duct 17 to protect the system from becoming damaged in the event of excessive pressure in the duct 11.

Consequently the pump acting through the medium of the nozzle produces a continuous motion of finely atomized material downwardly through the chamber 13, and inasmuch as steam (or any other suitable sterilizing medium) is continuously injected into the inlet end of the chamber through steam lines 18 entering the sides of the chamber above the nozzle 14 preferably in a manner such that steam flows in a substantially swirling or spiral path, it will be apparent that the steam and atomized material become thoroughly admixed during passage through the chamber. The steam enters the chamber 13 at about 140 lbs. per square inch pressure and at a temperature such as to maintain the interior of the chamber between 250° and 280° F. for the sterilization of milk products, or at temperatures above 300° F. for the sterilization of fruit juices and soups.

Impact of the steam with the atomized material is avoided by injection of the steam rearwardly of the spray nozzle 14, and thus objectional physical change in the food material being sterilized is precluded.

The sterilizing or steam chamber is maintained at a pressure of from 30 to 50 lbs. per square inch when milk products are being treated or up to 100 lbs. in the treatment of fruit juices and soups by means of an expansion valve 19 in the duct 20 connecting the outlet of the steam chamber with the inlet 21 of the vacuum pan 22.

With the foregoing pressures obtaining in the apparatus, the velocity of admixed atomized material and steam through the interior of the chamber 13 is such that material discharged by the spray nozzle completes passage through the chamber to the exterior thereof in less than 6 seconds' time. During this time interval, complete sterilization of the food material is effected in consequence to the substantially simultaneous pressure drop on the material and its reduction to an atomized mist-like state, and also the almost instantaneous temperature rise effected upon contact of the atomized material with the steam and further induced by the high pressure at the nozzle 14.

The atomized material upon being discharged from the chamber 13 in sterile condition, passes through the duct 20 to the vacuum pan 22. The duct 20, however, has a U shaped portion 23 the legs 24 of which are provided with steam jackets 25 to constitute a conventional tubular two stage evaporator the purpose of which is to enable control of the degree of concentration of the sterilized product.

Consequently, the sterile material after passing through the two stage evaporator is delivered into the vacuum pan where it is rapidly cooled and liquified.

A duct 26 leads from the outlet of the vacuum pan to conduct the sterilized and concentrated liquid food material to suitable packaging apparatus (not shown).

In the operation of the apparatus the pump 9 forces the liquiform material 6 through the duct 11 preferably at a pressure of between 2500 and 3000 lbs. per square inch for discharge into the interior of the steam chamber through the spray nozzle 14 which reduces the material to a finely atomized mist-like state.

When steam is used as the sterilizing medium, the interior of the sterilizing chamber is maintained at a pressure of between 30 to 1000 lbs. per square inch. Consequently, the abrupt and substantial drop in pressure on the material entering the chamber 13 causes rapid expansion and rupturing of micro-organisms in the material being sterilized.

The remaining micro-organisms are still further rapidly expanded and ruptured by the sudden temperature rise therein as the atomized food material commingles with the steam in the chamber, and such bacteria and spores as are not destroyed by rupturing are killed by heat within six seconds time or less during which time the atomized material traverses the sterilizing chamber. Actually, sterilization of some liquiform feed products including milk, etc., is accomplished inside of one or two seconds time.

The use of a spray nozzle through which the liquiform material is forced at high pressure also insures breaking up of colonies of spores and bacteria to readily enable their complete destruction and thereby make rapid sterilization possible.

Since complete sterilization is effected extremely rapidly in the practice of the method of this invention it has been found that the flavor of the milk or other liquiform milk products is left unchanged, or in other words, sterilization is effected before the advent of such chemical or physical changes in the milk as would act to destroy the natural milk flavor or stability of the product.

The two stage evaporator 24—25 and the vacuum pan 22 may be used to concentrate the sterile material to a point such that the additional moisture added to the material by the injection of steam is removed, or concentration may be continued to further reduce the moisture content of the material and effect any desired degree of concentration in the product. This is done by adjustment of the steam pressure in the jackets 25 in the conventional manner.

Milk and other liquiform products sterilized by the apparatus and method of this invention have been found to be completely stable and free from coagulation under the influence of heat. Also as stated, food products treated by this method retain their original flavor as distinguished from past methods which impart a "canned" or "metallic" taste to the sterilized product.

From the foregoing description taken in consideration with the accompanying drawing, it will be apparent to those skilled in the art that this invention provides an improved method of sterilizing such foods as milk and various milk products as well as many other liquiform food products, and that the apparatus for carrying out the method is desirably simple.

What I claim as my invention is:

1. A method of producing a sterilized liquid food product which comprises: forcing a liquid food material under a pressure of at least twenty five hundred (2,500) pounds per square inch through a constriction and discharging the material as a fine atomized mist directly into a sterilizing zone maintained at a low, above atmospheric, pressure under one hundred (100) pounds per square inch and containing steam at a temperature and pressure sufficient to maintain the sterilizing zone at a sterilizing temperature so that micro-organisms contained in the particles of mist are subjected to disruptive expansion and an abrupt rise in temperature to the sterilizing range substantially simultaneously with the formation of the mist; maintaining the material in an atomized mist-like state throughout its stay in the sterilizing zone to assure complete sterilization thereof in a few seconds; withdrawing the sterilized material from the sterilizing zone; and liquefying the sterilized food product so withdrawn from the sterilizing zone.

2. A method of producing a sterilized liquid food product which comprises: forcing a liquid food material under homogenizing pressure of between twenty five hundred (2,500) and three thousand (3,000) pounds per square inch through a constriction and discharging the material as a fine atomized mist directly into a sterilizing zone maintained at a low, above atmospheric, pressure under one hundred (100) pounds per square inch to thus subject micro-organisms contained in the particles of the atomized mist to a rupturing expansion; flowing steam through the sterilizing zone along with the atomized mist and in the general direction of movement of the mist to maintain a sterilizing temperature of above 212° F. in the sterilizing zone and to envelope each minute particle of the mist with steam so as to substantially instantaneously bring the atomized mist-like material to a sterilizing temperature above 212° F. without entailing severe impact between the steam and the particles of mist; maintaining the material being treated in an atomized mist-like state throughout its passage through the sterilizing zone so as to assure sterilization thereof in a few seconds; withdrawing the sterilized material from the sterilizing zone; and liquefying the sterilized food product so withdrawn from the sterilizing zone.

3. A method of producing a sterilized liquid food product which comprises: placing liqui-form food material to be sterilized under homogenizing pressure on the order of twenty five hundred (2,500) pounds per square inch; converting the material to an atomized mist-like state and concomitantly therewith abruptly reducing the pressure thereon to a low value above atmospheric and subjecting the same to heat of sterilizing temperature, so that microorganisms in the material are subjected to disruptive expansion and an abrupt rise in temperature to the sterilizing range substantially simultaneously with the conversion of the material to said atomized mist-like state; maintaining the material in its atomized mist-like state under said conditions of low, above atmospheric, pressure and sterilizing temperature for a period of a few seconds to assure complete destruction of the micro-organisms contained in the material without developing objectionable cooked taste; withdrawing the sterilized atomized mist-like material directly into a zone of still further reduced pressure; and condensing the sterilized material in said zone of further reduced pressure to its final liquid state.

EDWARD C. JOHNSTON.